United States Patent [19]

Chiou

[11] Patent Number: 4,491,824
[45] Date of Patent: Jan. 1, 1985

[54] SAFETY INDICATOR FOR VEHICLES

[76] Inventor: Nan-Mu Chiou, 2nd Floor, No. 15, La. 7, San Min Rd., Taipei, Taiwan

[21] Appl. No.: 338,687

[22] Filed: Jan. 11, 1982

[51] Int. Cl.³ .............................................. B60Q 1/00
[52] U.S. Cl. ..................................... 340/66; 340/62; 340/71; 340/74; 340/78; 340/79; 340/81 R; 307/10 LS
[58] Field of Search ........................ 340/66, 62, 69, 67, 340/71, 72, 74, 84, 76, 52 F, 53, 79, 81 R; 307/10 LS; 315/82, 83

[56] References Cited

U.S. PATENT DOCUMENTS

| | | | |
|---|---|---|---|
| 3,109,158 | 10/1963 | Coombs | 340/66 |
| 3,171,058 | 2/1965 | Ono | 340/62 |
| 3,320,586 | 5/1967 | Wagner | 340/66 |
| 3,676,844 | 7/1972 | Hendrickson | 340/71 |
| 3,732,539 | 5/1973 | Easterly | 340/62 |
| 3,787,808 | 1/1974 | Knoff | 340/66 |

Primary Examiner—Donnie L. Crosland

[57] ABSTRACT

A safety indicator for a vehicle shows the actual status of the vehicle by means of lamps of various colors mounted on the head and tail of the vehicle. A photo-interrupter is used to control the actions of the lamps and headlights by sensing the location of the needle on the speedometer. Switches mounted on the accelerator and brake pedals respectively are used for further control of the lamps. The lamps are serially connected with small bulbs provided on the instrument panel so that driver may check whether or not the lamps and headlights are operating properly.

2 Claims, 2 Drawing Figures

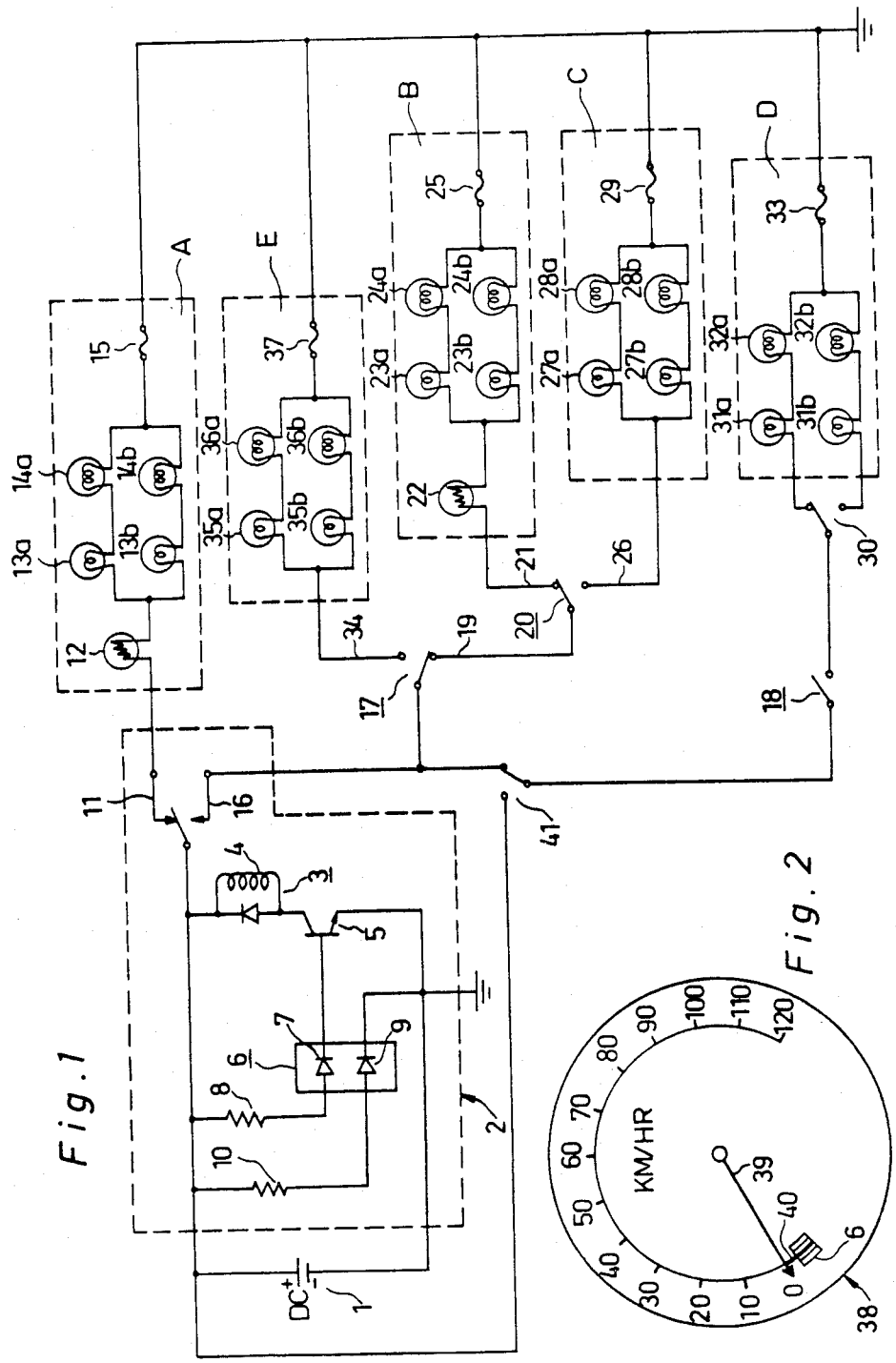

SAFETY INDICATOR FOR VEHICLES

BACKGROUND OF THE INVENTION

This invention relates to a safety indicator for vehicle, and particularly to one which is capable of indicating the actual operating status of a vehicle for the drivers of other vehicles.

The density of vehicle is increasing continuously as a result of economic development and vehicle accidents are thus increased correspondingly. According to the statistical information, most of the accidents are due to that the drivers cannot respond rapidly when the road conditions are suddenly changed. Such accidents are especially easily caused by the vehicles running with high speed (as on the freeway) and always results in collision between vehicles.

Since the vehicle density is highly increased, a suitable distance can hardly be kept between travelling vehicles and thus the view of the driver may be obstructed by the vehicle in front. Therefore, under many circumstances, the driver of the following vehicle can has an understanding of the following vehicle and the action of the front vehicle only by means of the indicator lights provided on the tail of the front vehicle.

For example, the direction indicator lamps show that the vehicle is desired to have a turning or leaving the present lane and the stop lamp shows that the driver has actuated the brake pedal. Although this type of indicator system has been used for many years and a certain effect is obtained under somewhat lower speed, it is not well-satisfied and cannot provide a complete indication.

The traditional indicator system cannot clearly indicate, in addition to the turning and braking actions, whether or not the vehicle is accelerating, sliding and preparing to apply a brake or having a trouble. Therefore when the driver of the vehicle finds that the road conditions are inadequate, releases the accelerator pedal and prepares to actuate the brake pedal, the following vehicle will not recognize this condition and take any action until the brake pedal of the front vehicle is actuated and the stop lamps are lighted up. This always causes a chain collision.

When the vehicle stops for the reason of trouble or others, the vehicle itself has no means of indicating such a condition. Although the red lamps provided on the tail of the vehicle may be lit up at night, it cannot indicate whether or not the vehicle is moving. In addition, the manner of increasing the intensity of the red lamps when the brake pedal is actuated at night is also hard to be distinguished.

The headlight of a vehicle can be selected to use as a long-range light or short-range light. No matter whether the headlight is used as a long-range light or short-range light, when the vehicle is temporarily stopped (e.g., before a traffic light), the light thereof always dazzles other drivers, therefore the headlight has to be turned off and this causes certain inconvenience to the driver.

Moreover, in the traditional indicator system, the driver cannot determine whether or not the various indicator lamps work well without leaving the car. Especially in the case of the stop lamp, which will not be lit up until the brake pedal is actuated, a single person cannot simultaneously actuate the pedal and check the stop lamp provided at the tail of the vehicle. At least two persons are needed in such a checking procedure.

In view of the above-mentioned disadvantages of the conventional systems, the object of the present invention is to provide a safety indicator which can clearly indicate the operating status of a vehicle.

The another object of the present invention is to provide a device for temporarily turning off the headlight when the vehicle is stopped and turning it on again when the vehicle moves.

The another object of this invention is to provide a device for determining whether or not the various indicating lamps are working properly without leaving the car.

SUMMARY OF THE INVENTION

This invention utilizes, in addition to the conventional yellow direction lights and red stop light, a green light to indicate that the vehicle is travelling with a constant speed or accelerating, a green blinking light to indicate that the vehicle has ceased to accelerate and there is a possibility of applying a brake, a red blinking light to indicate that the vehicle has stopped or merely travels with a lowest speed (about 2 km/hr.).

This invention mainly utilizes a speed sensitive means and switches mounted respectively on the brake and accelerator pedals to control the variation of light signals. The headlight switching on and off may be operated manually of automatically. Bulbs corresponding to the indicator lamps and headlight are provided on the instrument panel so that the driver may determine whether on not the lights are operating properly.

The other structures, characteristics, functions and advantages will be described with respect to the accompanying drawings.

BRIEF DESCRIPTION OF THE DRAWINGS

FIG. 1 is a circuit diagram for a preferred embodiment of this invention, and

FIG. 2 is a schematic diagram showing a manner of mounting the speed sensitive means on the speedometer.

DESCRIPTION OF THE PREFERRED EMBODIMENTS

The safety indicator according to this invention utilizes the battery 1 of the vehicle itself as the power source. The left portion surrounded by dotted line in FIG. 1 is the speed sensitive means 2 which may be mounted on a printed circuit board (not shown).

The speed sensitive means 2 includes a relay 3. The coil 4 of relay 3 is connected at one end to the positive terminal of battery 1 and at the other end to the negative terminal of battery 1 Via the collector-emitter path of transistor 5.

The base of transistor 5 is connected to the positive terminal via the photo sensitive diode 7 within the photo-interrupter 6 and resistor 8. The light emitting diode (LED) 9 is connected with its anode to the positive terminal via resistor 10 and with its cathode to the negative terminal of battery 1.

The normally closed contact 11 of relay 3 is connected to a red blinking light circuit A.

The red blinking light circuit A includes a winker 12, a parallel circuit formed by two sets of small red bulbs 13a, 13b and red lamps 14a, 14b connected in series respectively. The other end of the red blinking light circuit A is connected to the ground (negative terminal).

The normally open contact 16 of relay 3 is connected on one hand to a brake switch 17 and on the other hand to a headlight switch 18 via a switch 41. The brake switch 17 is a single pole double throw (SPDT) microswitch which is mounted on the brake pedal and actuated by the pressure applied on the brake pedal. The switch 41 is used to select the manual or automatic control of headlight and the headlight switch 18 is used for connecting the power for headlight.

The normally closed contact 19 of brake switch 17 is connected to a accelerator switch 20. Switch 20 is a pressure sensitive switch which will not be actuated until the pressure applied thereon has reached a predetermined level. Switch 20 is mounted on the accelerator pedal of the vehicle so as to be actuated by the pressure applied on the pedal.

It will be noted that the said predetermined pressure amount may be adjusted to adapt various vehicles and drivers, which will be further described.

The normally closed contact 21 of switch 20 is connected to a green blinking light circuit B.

The green blinking light circuit B includes a winker 22, a parallel network formed by two sets of small green bulbs 23a, 23b and green lamp 24a, 24b connected in series respectively and a fuse 25. The other end of green blinking light circuit B is grounded.

The normally open contact 26 of switch 20 is connected to a green light circuit C includes a parallel network formed by two sets of small green bulbs 27a, 27b and green lamps 28a, 28b connected in series respectively. The green light circuit C also includes a fuse 29.

The headlight switch 18 is connected to selector switch 30 for selecting the long-range light or short-range light. The selector switch 30 is connected on one side to a serial network of small bulb 31 and long-range lamp 32a and on the the other side to a serial network of small bulb 31b and short-range lamp 32b. A fuse 33 is also provided in the headlight circuit D.

The normally open contact 34 of brake switch 17 is connected to a red light circuit E. The red light circuit E includes a parallel circuit formed by two serial network of small red bulbs 35a, 35b and red lamps 36a, 36b, respectively, and a fuse 37. The other end of red light circuit E is grounded.

The photo-interrupter 6 within speed sensitive means 2 may be mounted to the speedometer 38 in a manner shown in FIG. 2. The needle 39 of speedometer 38 is provided with a strip 40 at the free end as shown in FIG. 2, in which the strip 40 is located within the space between photo-sensitive diode 7 and light emitting diode 9 of the photo-interrupter 6.

It will be noted that the photo-interrupter 6 may be mounted in other relationships with the speedometer 38.

The lamps 14a, 24a, 28a and 36a are mounted at the tail of the vehicle and the lamps 14b, 24b, 28b and 36b are mounted at the head of the vehicle. The only requirement for the mounting of these lamps is that they should be provided at apparent positions.

The small bulbs 13a, 13b, 35a, 35b, 23a, 23b, 27a, 27b, 31a and 31b are mounted on the instrument panel of the vehicle. The long-range lamp 32a and short-range 32b are mounted on the head of the vehicle in a conventional manner.

When the driver inserts a key into the ignition switch (not shown) to connect this circuit to the power supply, the safety indicator of this invention is in a static condition. While the needle 39 of speedometer 38 (FIG. 2) is indicating the position of 0 km/hr., the strip 40 remains within the photo interrupter 6. Therefore the light of light emitting diode 9 can not reach the photo-sensitive diode 7. The high resistance of photo-sensitive diode 7 keeps transistor 5 in the cut off region.

The coil 4 of relay 3 does not operate under the condition of without current flowing. Therefore the current flows from the positive terminal of battery 1 to the red blinking light circuit A via the normally closed contact 11. The serial networks of red bulbs 13a and 13b and lamps 14a and 14b are blinked by means of the winker 12. In other words, the red lamps provided on the head and tail of the vehicle and the bulbs on the instrument panel blinks. Under such a condition, neither the pressing of the accelerator pedal nor that of the brake pedal will affect the blinking red lamps. This blinking red light may show that the vehicle is in a stopping status.

When the vehicle is put into the first notch, the accelerator pedal is pressed to accelerate the vehicle, however the red blinking light will not be changed until the needle 39 of the speedometer 38 is rotated a predetermined angle by the travelling speed of the vehicle so as to move the strip 40 out of the photo-interrupter 6.

When the vehicle speed has reached a certain speed (e.g. about 2 km/hr.), the rotation of needle 39 will move strip 40 out of photo-interrupter 6. Please not that a speed of 2 km/hr. is very slow and may be readily obtained by slightly accelerating the vehicle. The movement of strip 40 out of photo-interrupter 6 causes the light of light emitting diode 9 to be projected on the photo-sensitive diode 7. The photo-sensitive diode 7 then presents a low resistance and transistor 5 conducts under the bias current flowing there through.

Then the coil 4 of relay 3 is energized and the normally open contact 16 is connected to the positive terminal of battery 1. The operation of red blinking light circuit A is ceased. The power is fed to the green blinking light circuit B through the contact 19 of the brake switch 17 and the normally closed contact 21 of te accelerator swtich 20. Then the green bulbs 23a and 23b mounted on the instrument panel and green lamps 24a and 24b on the head and tail of the vehicle blink under the control of winker 22.

As it is mentioned in the above, the accelerator switch 20 will not be actuated until the pressure applied thereon has reach a predetermined level. In a preferred embodiment, the actuating pressure level is adjusted to three-tenth of the pressure applied when the accelerator pedal is pressed completely (full-speed). In other words, the green blinking light circuit B keeps the lamps therein blinking until the accelerator pedal is pressed over three-tenth. This indicates that although the vehicle is moving, but it has not reached the fullspeed thereof or the accelerator pedal has been released and there is the possibility of applying a brake.

When the accelerator pedal has been pressed for a certain degree so that the vehicle is travelling with full-speed and the accelerator switch 20 is actuated, the green blinking light is ceased the circuit C via contact 26 and the green bulbs 27a and 27b and green lamps 28a and 28b are lit up. This indicates that the vehicle is travelling normally.

If the driver has found that the road condition is inadequate and tries to show down. The switch 20 is returned to the normal mode when the accelerator pedal is released to under the predetermined pressure. The current is again fed to the green blinking light circuit B and this causes the green steady signal to turn back into the green blinking signal which indicates that the vehicle has ceased to accelerate and there is a possibility of applying a brake.

When the driver press the brake pedal, the actuated brake switch 17 feeds the current to the red light circuit E through contact 34. The red lamps mounted on the head and tail of the vehicle and the red bulbs on the instrument panel are lit up and indicate that the brake has been applied. Both the green light circuits B and C are deactuated since the current is not fed to the switch 20 anymore.

When the vehicle is slowed down by the brake until the needle 39 has fallen within the predetermined range, the strip 40 returns into the photo-interrupter 6 and the relay 3 is deenergized since the bias for transistor 5 is out. The current is again fed to the red blinking circuit A through contact 11 and therefore the red blinking signal is lit up.

Whenever the vehicle is stopped by troubles or other reasons, the blinking red signal will show this condition for the drivers in other vehicles.

Moreover, the headlight circuit D will not have the power supply until the speed of the vehicle has exceeded a predetermined level. When the vehicle is used at night, the headlight switch 18 is closed and the switch 30 may be used to select the long-range lamp 32a or short-range lamp 32b. When the contact 16 of relay 3 is actuated by the speed, the current may be fed to the selected headlight lamp and the current will be ceased when the relay 3 is deenergized by the low speed. In other words, the headlight lamp 32a and 32b are turned off during the stopping status of the vehicle and are turned on again when the vehicle travels again.

The switch 41 is provided for the selection of manual control or automatic control of the headlight lamps.

The functions of the safty indicator for vehicle of this invention are listed out in Table I for a better reference.

may have sufficient time to take a proper procedure and the rate of accident may be lowered to a minimum. This invention is especially effective and useful for thore vehicles travelling on the freeway.

Since all the lamps such as the red and green lamps or the headlights have respective serially connected small bulbs mounted on the instrument panel, the driver may check them up without leaving the vehicle.

When the vehicle stops such as before a traffic signal, the headlight may be automatically switched off and will not disturb the drivers in other vehicles, which will be lit up when the vehicle moves again.

Though this invention has been described with respect to a preferred embodiment, however the variation or modification thereof without leaving the spirit of this invention should be considered as falling within the scope of this invention.

What is claimed is:

1. A safety indicator for a vehicle having a brake system operated by a brake pedal, headlights, an accelerator pedal and a speedometer to indicate vehicle speed, the safety indicator comprising:

a plurality of red and green lamps located on the vehicle;

red and green warning bulbs corresponding to each of the red and green lamps respectively, the bulbs being located within the vehicle on an instrument panel;

a central circuit connected to each of the lamps and its corresponding bulb, the central circuit having a flashing red light circuit and a red light circuit each connected to the red lamps and bulbs and a flashing green light circuit and a green light circuit each connected to the green lamps and bulbs;

a headlight circuit between the central circut and the headlights of the vehicle;

a brake switch mounted on or near the brake pedal and activated when the brake pedal is depressed,

TABLE I

| VEHICLE STATUS | INDICATING SIGNAL | MEANING |
|---|---|---|
| 1. THE VEHICLE HAS BEEN STOPPED FOR TROUBLE OR OTHER REASONS. 2. THE VEHICLE HAS JUST BEEN STARTED AND A PREDETERMINED SPEED HAS NOT BEEN REACHED. | RED BLINKING LIGHT | PLEASE NOTE THE STATUS OF THIS VEHICLE AND BE CAREFUL. |
| THE SPEED HAS REACHED THE PREDETERMINED STANDARD, BUT THE VEHICLE HAS NOT YET TRAVELLED WITH FULL-SPEED. | GREEN BLINKING LIGHT | 1. THE VEHICLE IS MOVING BUT HAS NOT REACHED A STEADY SPEED.<br><br>2. THE ROAD CONDITION IS INADEQUATE, THE VEHICLE DOES NOT ACCELERATE AND THERE IS A POSSIBILITY OF APPLYING A BRAKE. |
| THE VEHICLE IS TRAVELLING WITH STEADY SPEED OR ACCELERATING (THE ACCELERATOR PEDAL HAS BEEN PRESSED OVER A PREDETERMINED DEGREE). | GREEN STEADY LIGHT | THE VEHICLE IS TRAVELLING STEADILY OR ACCELERATING. |
| THE VEHICLE IS APPLYING A BRAKE. | RED STEADY LIGHT | THE BRAKE OF THE VEHICLE HAS BEEN APPLIED AND THE VEHICLE IS SLOWING DOWN. |

The means of the safty indicator of this invention, all the status of the vehicle may be clearly shown to the other drivers. Therefore the drivers in other vehicles the brake switch being connected to the central circuit;

a pressure sensitive accelerator switch mounted at or near the accelerator pedal and activated when the accelerator is depressed to a predetermined level, the accelerator switch being connected to the central circuit;

a photo-interrupter located at the speedometer of the vehicle; and a relay switch electrically connected to the central circuit and the photo-interrupter respectively;

whereby the relay switch selectively activates either the flashing red light circuit and headlight circuit when the vehicle speed, as detected by the photo-interrupter, is zero or substantially zero to cause the red lamps and bulbs to be intermittently energized and the headlights to be switched off, or the brake switch when the vehicle is moving;

the brake switch, when activated, selectively activates either the red lamps and bulbs circuit when the brake pedal is depressed to cause the red lights to be continuously energized or the accelerator switch when the brake pedal is not depressed; and the accelerator switch, when activated, selectively activates either the green light circuit when the accelerator pedal is stationary causing the green lamps and bulbs to be continuously energized or the flashing green light circuit when the accelerator pedal is moved causing the green lamps and bulbs to be intermittently energized.

2. A safety indicator as claimed in claim 1 wherein the speedometer includes a needle to indicate vehicle speed, the photo-interrupter is mounted on the speedometer at or near that part thereof where the needle indicates zero or substantially zero vehicle speed, and the needle is provided with a strip at its free end which is adapted to be inserted within the photo-interrupter when the needle is at or approaches that part of the speedometer where zero or substantially zero vehicle speed is indicated.

* * * * *